(12) United States Patent
Chai et al.

(10) Patent No.: US 11,214,645 B2
(45) Date of Patent: Jan. 4, 2022

(54) METHOD FOR PREPARING GRAFT COPOLYMER AND THERMOPLASTIC RESIN MOLDED ARTICLE

(71) Applicant: LG CHEM, LTD., Seoul (KR)

(72) Inventors: Joo Byung Chai, Daejeon (KR); Yu Sung Jung, Daejeon (KR); Jong Beom Kim, Daejeon (KR); Chang Sull Kim, Daejeon (KR); Eun Seon Park, Daejeon (KR); Tae Young Jeon, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/767,465

(22) PCT Filed: Jan. 23, 2019

(86) PCT No.: PCT/KR2019/000966
§ 371 (c)(1),
(2) Date: May 27, 2020

(87) PCT Pub. No.: WO2019/156394
PCT Pub. Date: Aug. 15, 2019

(65) Prior Publication Data
US 2020/0407478 A1   Dec. 31, 2020

(30) Foreign Application Priority Data

Feb. 7, 2018 (KR) .................. 10-2018-0015164
Jan. 22, 2019 (KR) .................. 10-2019-0008259

(51) Int. Cl.
*C08F 279/04* (2006.01)
(52) U.S. Cl.
CPC .................... *C08F 279/04* (2013.01)
(58) Field of Classification Search
CPC ......... C08L 25/12; C08L 55/02; C08F 279/04
See application file for complete search history.

(56) References Cited

U.S. PATENT DOCUMENTS

| 4,430,478 | A | * | 2/1984 | Schmitt | .................. | C08L 25/12 |
| | | | | | | 525/71 |
| 5,270,387 | A | * | 12/1993 | Sheilds | .................. | C08F 279/02 |
| | | | | | | 525/71 |
| 2011/0275763 | A1 | * | 11/2011 | Nie ner | .................. | C08L 51/04 |
| | | | | | | 525/71 |
| 2016/0137830 | A1 | | 5/2016 | Ahn et al. | | |
| 2016/0319128 | A1 | | 11/2016 | Park et al. | | |
| 2018/0030191 | A1 | * | 2/2018 | Chai | .................. | C08F 279/04 |
| 2020/0157699 | A1 | * | 5/2020 | Wagner | .................. | C23C 18/42 |

FOREIGN PATENT DOCUMENTS

| EP | 3243875 | 11/2017 |
|---|---|---|
| KR | 10-1995-0005861 A | 3/1995 |
| KR | 10-1995-0018237 A | 7/1995 |
| KR | 10-2000-0026020 A | 5/2000 |
| KR | 10-2010-0044195 A | 4/2010 |
| KR | 10-2012-0070932 A | 7/2012 |
| KR | 10-2015-0016093 A | 2/2015 |
| KR | 10-2015-0033843 A | 4/2015 |
| KR | 10-2016-0048331 A | 5/2016 |
| KR | 10-2016-0129746 A | 11/2016 |
| WO | WO2019156394 A1 | 8/2019 |

OTHER PUBLICATIONS

Extended European Search Report for PCT/KR2019000966, dated Feb. 5, 2021.

* cited by examiner

*Primary Examiner* — Jeffrey C Mullis

(57) ABSTRACT

The present invention relates to a method for preparing a graft copolymer including polymerizing a conjugated diene-based monomer to prepare a small-size conjugated diene-based polymer; enlarging the small-size conjugated diene-based polymer to prepare a large-size conjugated diene-based polymer; and polymerizing the small-size conjugated diene-based polymer, the large-size conjugated diene-based polymer, an aromatic vinyl-based monomer and a vinyl cyan-based monomer to prepare a graft copolymer, wherein a weight ratio of the small-size conjugated diene-based polymer and the large-size conjugated diene-based polymer is 10:90 to 40:60 in preparing the graft copolymer.

10 Claims, No Drawings

METHOD FOR PREPARING GRAFT COPOLYMER AND THERMOPLASTIC RESIN MOLDED ARTICLE

CROSS-REFERENCE TO RELATED APPLICATIONS

The present application claims the benefit of priority based on Korean Patent Application Nos. 10-2018-0015164, filed on Feb. 7, 2018, and 10-2019-0008259, filed on Jan. 22, 2019, the entire contents of which are incorporated herein by reference.

TECHNICAL FIELD

The present invention provides a method for preparing a graft copolymer and a thermoplastic resin molded article, and more particularly, to a method for preparing a graft copolymer of which plating properties, coloring properties, mechanical properties, surface characteristics and processability are all excellent, and a thermoplastic resin molded article.

BACKGROUND ART

Generally, ABS graft copolymers prepared by emulsion polymerization are largely divided into a general, flame retardant, extrusion, heat resistant, and transparent resin composition according to the properties of a matrix copolymer used together, and may be subdivided according to the use into materials for plating, painting, cars, toys, etc.

Resin compositions including such ABS graft copolymer are often required to have basically excellent impact resistance, processability and coloring properties, and properties such as plating properties in combination.

In order to improve plating properties, a method of controlling the chemical composition or graft ratio of an ABS graft copolymer, and the gel content, constituent elements or amount of a conjugated diene-based polymer, has been suggested.

To explain the method of controlling the constituent elements or amount of the conjugated diene-based polymer in detail, a method of increasing the number of anchor holes by increasing the amount of the conjugated diene-based polymer, and a method of introducing a small-size butadiene rubber polymer during preparing an ABS graft copolymer are used.

According to the method of adding the small-size conjugated diene-based polymer during preparing the ABS graft copolymer, plating adhesion may be improved, but impact strength of the ABS graft copolymer at a low temperature and a high temperature may be degraded. Also, the dispersibility of a conjugated diene-based polymer in the ABS graft copolymer may be deteriorated, and accordingly, plating appearance properties may be degraded, and thermal shock strength may be decreased if cycles from a low temperature to a high temperature are repeated. In addition, the small-size conjugated diene-based polymer elevates the viscosity of the ABS graft copolymer, and as a result, the processability of a thermoplastic resin composition may be decreased. If the graft ratio of the ABS graft copolymer is increased to overcome such problems, free-SAN in the ABS graft copolymer may decrease and as a result, processability may be degraded.

Accordingly, research on improving plating properties without decreasing processability is being continued.

DISCLOSURE OF THE INVENTION

Technical Problem

An object of the present invention is to provide a method for preparing a graft copolymer having excellent plating properties, coloring properties, mechanical properties, surface characteristics and processability, and a thermoplastic resin molded article.

Technical Solution

According to an aspect of the present invention, there is provided a method for preparing a graft copolymer including polymerizing a conjugated diene-based polymer to prepare a small-size conjugated diene-based polymer; enlarging the small-size conjugated diene-based polymer to prepare a large-size conjugated diene-based polymer; and polymerizing the small-size conjugated diene-based polymer, the large-size conjugated diene-based polymer, an aromatic vinyl-based monomer and a vinyl cyan-based monomer to prepare a graft copolymer, wherein a weight ratio of the small-size conjugated diene-based polymer and the large-size conjugated diene-based polymer is 10:90 to 40:60 in preparing the graft copolymer.

In addition, the present invention provides a thermoplastic resin molded article which is prepared using a thermoplastic resin composition including the graft copolymer prepared by the above-described method; and a copolymer including a unit derived from an aromatic vinyl-based monomer and a unit derived from a vinyl cyan-based monomer, wherein the thermoplastic resin molded article has a plating adhesion strength of 7 N/m or more.

Advantageous Effects

According to the method for preparing a graft copolymer of the present invention, a graft copolymer having excellent plating properties, coloring properties, mechanical properties, surface characteristics and processability, and a thermoplastic molded article may be manufactured.

BEST MODE FOR CARRYING OUT THE INVENTION

Hereinafter, the present invention will be described in more detail to assist the understanding of the present invention.

It will be understood that words or terms used in the specification and claims shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words or terms to best explain the invention.

The average particle diameter, standard deviation and particle size distribution of the conjugated diene-based polymer may be measured using a dynamic light scattering method, particularly, using Nicomp 380 equipment (product name, manufacturer: PSS) in the present invention.

The "average particle diameter" or "Dv" referred to in the present disclosure means an arithmetic average particle diameter in particle size distribution measured by the dynamic light scattering method. The arithmetic average particle diameter may be intensity distribution average particle diameter.

The measurement method by the dynamic light scattering method, and the computing methods of the standard deviation and the particle size distribution may be performed by well-known methods in this technical field.

In the present invention, the weight average molecular weight may be measured using tetrahydrofuran (THF) as an eluent through gel permeation chromatography (GPC, waters breeze) as a relative value with respect to a standard polystyrene (PS) specimen.

In the present invention, the graft ratio may be obtained by dissolving a certain amount of a graft copolymer in a solvent, centrifuging using a centrifuge, and drying to obtain a dried material, and then computing based on the equation below.

In detail, a certain amount of a graft copolymer is added to acetone and stirred to dissolve the graft copolymer. The solution was added to a centrifuge, which was set to 20,000 rpm and −20° C., a supernatant was separated, and a precipitate was dried in a hot air drier for 12 hours. The weight of the dried material was measured and the graft ratio may be computed based on the following equation:

Graft ratio (%)=[(amount of copolymer of grafted aromatic vinyl-based monomer and vinyl cyan-based monomer)/(amount of conjugated diene-based polymer)]×100 amount of conjugated diene-based polymer: the solid content of a conjugated diene-based polymer theoretically added amount of copolymer of grafted aromatic vinyl-based monomer and vinyl cyan-based monomer=(amount of dried material obtained)−(sum of amount of conjugated diene-based polymer)

In the present invention, the gel content may be measured by coagulating a conjugated diene-based polymer latex using methanol, washing, and drying in a vacuum oven of 60° C. for 24 hours, and then, the lump (specimen) thus obtained was cut using scissors, and 1 g thereof was taken and put in 100 g of toluene and stored at room temperature for 48 hours in a dark room, and then, sol and gel are separated. The gel content may be measured by the following equation:

Gel content (%)=[gel weight/specimen weight]×100

In the present invention, the conjugated diene-based monomer may be one or more selected from the group consisting of 1,3-butadiene, isoprene, chloroprene and piperylene, and among them, the 1,3-butadiene is preferable.

In the present invention, the aromatic vinyl-based monomer may be one or more selected from the group consisting of styrene, α-methyl styrene, α-ethyl styrene, and p-methyl styrene, and among them, styrene is preferable.

In the present invention, the vinyl cyan-based monomer may be one or more selected from the group consisting of acrylonitrile, methacrylonitrile, phenylacrylonitrile and α-chloroacrylonitrile, and among them, acrylonitrile is preferable.

1. Method for Preparing Graft Copolymer

The method for preparing a graft copolymer according to an embodiment of the present invention includes 1) polymerizing a conjugated diene-based monomer to prepare a small-size conjugated diene-based polymer (step 1); 2) enlarging the small-size conjugated diene-based polymer to prepare a large-size conjugated diene-based polymer (step 2); and 3) polymerizing the small-size conjugated diene-based polymer, the large-size conjugated diene-based polymer, an aromatic vinyl-based monomer and a vinyl cyan-based monomer to prepare a graft copolymer (step 3), wherein a weight ratio of the small-size conjugated diene-based polymer and the large-size conjugated diene-based polymer is 10:90 to 40:60 in the step of preparing the graft copolymer.

Hereinafter, the method for preparing a graft copolymer according to an embodiment of the present invention will be explained in detail.

1) Step 1

First, the conjugated diene-based monomer is polymerized to prepare a small-size conjugated diene-based polymer. Here, the polymerization may be emulsion polymerization.

Step 1 may include (1) initiating the polymerization of a conjugated diene-based monomer at 30 to 50° C. in the presence of an initiator and a redox-based catalyst (step 1-1); and (2) continuously adding the conjugated diene-based monomer in a constant rate after initiating the polymerization (step 1-2).

Step 1 may further include (3) further adding an initiator and a redox-based catalyst and polymerizing after step 1-2, in order to improve a polymerization conversion ratio (step 1-3).

Hereinafter, step 1 for preparing the small-size conjugated diene-based polymer will be explained in detail.

(1) Step 1-1

First, the polymerization of the conjugated diene-based monomer may be initiated at 30 to 50° C. in the presence of an initiator and a redox-based catalyst.

The initiator may be a peroxide-based initiator, and the peroxide-based initiator is a hydrophobic initiator, and may produce a small-size conjugated diene-based polymer having narrower particle size distribution when compared with a persulfate-based initiator which is a hydrophilic initiator. In addition, a polymerization conversion ratio may be increased even further.

Since the peroxide-based initiator is added together with the redox-based catalyst, decomposition in the above-described temperature range is easy and the polymerization may be initiated. If the persulfate-based initiator is added prior to initiating the polymerization, the initiator may not be decomposed and the polymerization may not be initiated in the above-described temperature range.

The peroxide-based initiator may be one or more selected from the group consisting of t-butyl peroxide, cumene hydroperoxide and diisopropylbenzene peroxide, and among them, the t-butyl peroxide is preferable.

The initiator may be added in 0.01 to 0.09 parts by weight, or 0.01 to 0.05 parts by weight with respect to 100 parts by weight of the conjugated diene-based monomer, and among them, addition of 0.01 to 0.05 parts by weight is preferable. If the above-described range is satisfied, the polymerization may be easily initiated and accordingly, a small-size conjugated diene-based polymer having narrow particle size distribution may be prepared.

The redox-based catalyst may promote the decomposition of the initiator at the above-described temperature, and may assist easy initiation of the polymerization.

The redox-based catalyst may be one or more selected from the group consisting of sodium formaldehyde sulfoxylate, sodium ethylenediamine tetraacetate, ferrous sulfate, dextrose, sodium pyrophosphate, anhydrous sodium pyrophosphate, and sodium sulfate, and among them, one or more selected from the group consisting of ferrous sulfate, dextrose, and sodium pyrophosphate are preferable.

The redox-based catalyst may be added in 0.1 to 1 parts by weight, or 0.2 to 0.5 parts by weight with respect to 100 parts by weight of the conjugated diene-based monomer, and among them, addition of 0.2 to 0.5 parts by weight is preferable. If the above-described range is satisfied, the polymerization may be easily initiated at the above-described temperature, and accordingly, a small-size conjugated diene-based polymer having narrow particle size distribution may be prepared.

In step 1-1, one or more selected from the group consisting of an aromatic vinyl-based monomer and a vinyl cyan-based monomer may be further added in addition to the conjugated diene-based monomer.

The one or more selected from the group consisting of an aromatic vinyl-based monomer and a vinyl cyan-based monomer may be added in 20 parts by weight or less, or 5 to 15 parts by weight with respect to 100 parts by weight of the conjugated diene-based monomer, and among them, addition of 5 to 15 parts by weight is preferable. If the above-described range is satisfied, a polymerization rate may be increased to improve productivity. In addition, the glass transition temperature of the small-size conjugated diene-based polymer increases, the acid agglutinability of the small-size conjugated diene-based polymer may be improved, and a particle shape may be kept stably.

If the polymerization of the conjugated diene-based monomer is initiated at the above-described temperature, a conjugated diene-based polymer having narrow particle size distribution, and having a small particle diameter, particularly, an average particle diameter of 0.05 to 0.15 μm may be prepared.

The polymerization may be performed in the presence of one or more selected from the group consisting of an emulsifier, a molecular weight adjusting agent, an electrolyte and ion exchange water.

The emulsifier may be one or more selected from the group consisting of a rosin acid alkali metal salt, a fatty acid alkali metal salt, and a fatty acid dimer alkali metal salt, and among them, the fatty acid dimer alkali metal salt is preferable.

The rosin acid alkali metal salt may be one or more selected from the group consisting of a potassium rosinate and a sodium rosinate, and among them, the potassium rosinate is preferable.

The fatty acid alkali metal salt may be a fatty acid alkali metal salt of $C_8$ to $C_{20}$, and one or more selected from the group consisting of an alkali metal salt of capric acid, an alkali metal salt of lauric acid, an alkali metal salt of palmitic acid, an alkali metal salt of stearic acid, an alkali metal salt of oleic acid and an alkali metal salt of linoleic acid, are more preferable.

The fatty acid dimer alkali metal salt may be a fatty acid dimer alkali metal salt of $C_8$ to $C_{20}$, may preferably be a fatty acid dimer potassium salt of $C_8$ to $C_{20}$, and may more preferably be an oleic acid dimer potassium salt.

The emulsifier may be added in 1 to 5 parts by weight or 1.5 to 4 parts by weight with respect to 100 parts by weight of the conjugated diene-based monomer, and among them, addition of 1.5 to 4 parts by weight is preferable. If included in the above-described range, a reaction rate may be kept suitably, and polymerization stability may be excellent. In addition, discoloration and gas generation due to the emulsifier may be minimized.

The molecular weight adjusting agent may be one or more selected from the group consisting of t-dodecyl mercaptan, n-dodecyl mercaptan, n-octyl mercaptan and an α-methyl styrene dimer, and among them, one or more selected from the group consisting of t-dodecyl mercaptan and an α-methyl styrene dimer are preferable.

The molecular weight adjusting agent may be 0.1 to 0.5 parts by weight or 0.1 to 0.3 parts by weight with respect to 100 parts by weight of the conjugated diene-based monomer, and among them, addition of 0.1 to 0.3 parts by weight is preferable. If included in the above-described range, the role of a reaction promoter as well as the molecular weight adjusting agent may be played, while maintaining an appropriate polymerization rate.

The electrolyte may be one or more selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $K_3PO_4$, $Na_3PO_4$ and $Na_2HPO_4$, and among them, $Na_2CO_3$ is preferable.

The electrolyte may be added in 0.1 to 1.0 parts by weight or 0.2 to 0.4 parts by weight with respect to 100 parts by weight of the conjugated diene-based monomer, and among them, addition of 0.2 to 0.4 parts by weight is preferable. If included in the above-described range, the particle diameter of the conjugated diene-based polymer may be suitably controlled, and the degradation of a polymerization conversion ratio may be prevented.

(2) Step 1-2

After initiating the polymerization, the conjugated diene-based monomer may be continuously added in a constant rate to perform polymerization.

If the conjugated diene-based monomer is continuously added in a constant rate, heat removal during polymerization is easy, and the runaway reaction due to excessive heating may be restrained. In addition, a conjugated diene-based polymer having narrow particle size distribution may be prepared by restraining the formation of new particles as well as growing the formed particles. Also, polymerization and latex stability may be improved by restraining the formation of new particles.

Step 1-2 may be performed after 2 to 6 hours or 3 to 5 hours from the initiation of the polymerization in step 1-1, and preferably performance after 3 to 5 hours.

If step 1-2 is performed after the passage of the above-described time, the formation of initial particles is completed, and the conjugated diene-based polymer may be easily grown to prepare a conjugated diene-based polymer having a target average particle diameter.

The weight ratio of the conjugated diene-based monomers added is step 1-1 and step 1-2 may be 20:80 to 80:20, or 50:50 to 80:20, and among them, 50:50 to 80:20 is preferable. If the above-described range is satisfied, the polymerization may be easily performed even at the initiation of the polymerization, the heating at the latter time of the polymerization may be controlled, and target particle diameter and particle size distribution may be easily accomplished. In addition, productivity may be improved.

In step 1-2, one or more selected from the group consisting of an emulsifier and an initiator may be continuously added in a constant rate together with the conjugated diene-based monomer.

The kind of the emulsifier is the same as explained in step 1-1, and among them, the rosin acid alkali metal salt is preferable.

The emulsifier may be added in 0.1 to 3 parts by weight or 0.3 to 1.5 parts by weight with respect to 100 parts by weight of the conjugated diene-based monomer, and among them, addition of 0.3 to 1.5 parts by weight is preferable. If the above-described amount is satisfied, polymerization may be performed stably.

The initiator may be a sulfite-based initiator. Since the sulfite-based initiator is a hydrophilic thermal decomposition initiator, if added during polymerization, polymerization may be easily performed and polymerization stability may be improved even further together with an emulsifier. Though the redox-based catalyst is not additionally added, polymerization may be easily performed, and impurities due to the redox-based catalyst may be minimized.

The sulfite-based initiator may be one or more selected from the group consisting of potassium persulfate, sodium persulfate and ammonium persulfate, and among them, potassium persulfate is preferable.

The initiator may be added in 0.1 to 0.5 parts by weight or 0.15 to 0.4 parts by weight with respect to 100 parts by weight of the conjugated diene-based monomer, and among them, addition of 0.15 to 0.4 parts by weight is preferable. If the above-described amount is satisfied, the polymerization may be easily performed.

Step 1-2 may be performed while elevating the temperature to 70 to 85° C. or 75 to 85° C., and among them, the temperature elevation to 75 to 85° C. is preferable.

If this step is performed while elevating the temperature to the above-described temperature, heating and pressure during polymerization may be effectively controlled.

Step 1-2 may be performed for 4 to 8 hours or 5 to 7 hours, and among them, performance for 5 to 7 hours is preferable. If step 1-2 is performed for the above-described time, the conjugated diene-based polymer may be prepared to have target particle diameter and particle size distribution.

(3) Step 1-3

After step 1-2, an initiator and a redox-based catalyst may be further added and polymerized.

The initiator and the redox-based catalyst may preferably be further added after finishing the continuous addition of the conjugated diene-based monomer in step 1-2.

If the initiator and the redox-based catalyst are added at the above-described point, the polymerization conversion ratio of the conjugated diene-based polymer may be even further increased.

The initiator may be a peroxide-based initiator, and the kinds and amounts of the peroxide-based initiator and the redox-based catalyst are the same as explained in step 1-1.

In step 1, the addition amounts of the initiator, redox-based catalyst, emulsifier, molecular weight adjusting agent and electrolyte may be based on total 100 parts by weight of the monomer added in the method for preparing the small-size conjugated diene-based polymer.

The small-size conjugated diene-based polymer prepared in step 1 may have an average particle diameter of 0.05 to 0.15 μm or 0.1 to 0.15 μm, and among them, 0.1 to 0.15 μm may is preferable.

If the above-described conditions are satisfied, the amount of the emulsifier added during polymerization is suitable, and gas generation due to remaining emulsifier is minimized and the surface characteristics of a molded article may be improved. In addition, plating adhesion may be further improved and the degradation of impact resistance may be minimized.

The standard deviation of the small-size conjugated diene-based polymer prepared in step 1 may be 30 nm or less or 25 nm or less, and among them, 25 nm or less is preferable. If the above-described conditions are satisfied, a large-size conjugated diene-based polymer having even more uniform average particle diameter may be provided.

The gel content of the small-size conjugated diene-based polymer prepared in step 1 may be 80 to 95%, 85 to 95% or 90 to 95%, and among them, 90 to 95% is preferable. If the above-described range is satisfied, the graft polymerization of the large-size conjugated diene-based polymer which will be described later, may be even easier.

2) Step 2

Then, the small-size conjugated diene-based polymer is enlarged to prepare a large-size conjugated diene-based polymer.

Step 2 may be a step of enlargement by adding a coagulant to the small-size conjugated diene-based polymer.

The coagulant may be an acid, and the coagulant may be one or more selected from the group consisting of phosphoric acid and acetic acid, and among them, the acetic acid is preferable.

The coagulant may be added in 1.0 to 2.5 parts by weight or 1.0 to 2.0 parts by weight with respect to 100 parts by weight of the small-size conjugated diene-based polymer, and among them, addition in 1.0 to 2.0 parts by weight is preferable. If added in the above-described range, an enlarged conjugated diene-based polymer having suitable average particle diameter and excellent stability may be prepared.

The coagulant may be continuously added in a constant rate. If the coagulant is continuously added, pH of a conjugated diene-based polymer latex is not rapidly changed, and the breaking of stability of the conjugated diene-based polymer latex may be minimized.

The coagulant may be continuously injected for 30 to 60 minutes or 30 to 50 minutes in a constant rate, and may preferably be continuously added for 30 to 50 minutes in a constant rate. If the above-described conditions are satisfied, pH of the conjugated diene-based polymer latex is not rapidly changed, and the breaking of stability of the conjugated diene-based polymer latex may be minimized.

A stirring process may be further performed for uniform dispersion of the coagulant, and the stirring may be performed for 10 to 60 minutes or 10 to 30 minutes, and may preferably be performed for 10 to 30 minutes. If the above-described conditions are satisfied, the coagulant added may be sufficiently mixed with the small-size conjugated diene-based polymer.

The coagulant may be added in a diluted solution state in a solvent for the uniform dispersion in the small-size conjugated diene-based polymer.

The concentration of the solution may be 3 to 10 wt % or 5 to 7 wt %, and among them, 5 to 7 wt % is preferable. If the above-described range is satisfied, the coagulant may be more uniformly dispersed in the small-size conjugated diene-based polymer or the first enlarged conjugated diene-based polymer. In addition, pH of the conjugated diene-based polymer latex is not rapidly changed, and the breaking of stability of the conjugated diene-based polymer latex may be minimized.

The solvent may be water.

After finishing step 2, an emulsifier and a basic material may be further added to stabilize the large-size conjugated diene-based polymer.

The emulsifier may be a rosin acid alkali metal salt, and among them, a potassium rosinate is preferable.

The emulsifier may be added in 0.1 to 0.5 parts by weight, or 0.2 to 0.4 parts by weight with respect to 100 parts by weight of the small-size conjugated diene-based polymer, and among them, addition in 0.2 to 0.4 parts by weight is preferable. If the above-described range is satisfied, the enlarged conjugated diene-based polymer latex may be stabilized and the storage thereof may become easy. In addition, if a molded article is manufactured using the large-sized conjugated diene-based polymer, gas generation due to the emulsifier may be minimized.

The basic material may be one or more selected from the group consisting of potassium hydroxide and sodium hydroxide, and among them, the potassium hydroxide is preferable.

The basic material may be added in 1 to 3 parts by weight or 1.5 to 2 parts by weight with respect to 100 parts by weight of the small-size conjugated diene-based polymer, and among them, addition in 1.5 to 2 parts by weight is preferable. If the above-described range is satisfied, the pH of the large-size conjugated diene-based polymer latex may be maintained suitably.

The large-size conjugated diene-based polymer prepared in step 2 may have an average particle size of 0.30 to 0.5 µm, or 0.35 to 0.5 µm, and among them, 0.35 to 0.5 µm is preferable. If the above-described conditions are satisfied, a graft copolymer having excellent mechanical properties may be prepared.

3) Step 3

Then, the small-size conjugated diene-based polymer, the large-size conjugated diene-based polymer, the aromatic vinyl-based monomer and the vinyl cyan-based monomer are polymerized. Here, the polymerization may be emulsion polymerization.

In this case, the weight ratio of the small-size conjugated diene-based polymer and the large-size diene-based polymer is 10:90 to 40:60.

The weight ratio of the small-size conjugated diene-based polymer and the large-size conjugated diene-based polymer is 10:90 to 40:60, and 25:75 to 35:65 is preferable. If the above-described conditions are satisfied, the aromatic vinyl-based monomer and the vinyl cyan-based monomer are sufficiently graft polymerized in the conjugated diene-based polymer to swell the conjugated diene-based polymer. In addition, the graft copolymer of which inside is sufficiently grafted has excellent compatibility with a matrix copolymer including a unit derived from the aromatic vinyl-based monomer and a unit derived from the vinyl cyan-based monomer, and the chains of the graft copolymer and the matrix copolymer during an extrusion process are entangled, thereby providing a thermoplastic resin composition having excellent mechanical properties. If the small-size conjugated diene-based polymer is included less than the above-described range, the plating properties and the coloring properties of the graft copolymer are not improved. If an excessive amount of the small-size conjugated diene-based polymer is included, the plating properties and the coloring properties of the graft copolymer are not improved and the dispersibility of the conjugated diene-based polymer in the graft copolymer is degraded, and the impact resistance of the graft copolymer is deteriorated.

The total amount of the small-size conjugated diene-based polymer and the large-size conjugated diene-based polymer may be 50 to 70 wt %, or 55 to 65 wt % with respect to the total weight of the small-size conjugated diene-based polymer, the large-size conjugated diene-based polymer, the aromatic vinyl-based monomer and the vinyl cyan-based monomer, and among them, addition of 55 to 65 wt % is preferable. If the above-described range is satisfied, the graft polymerization may be easily performed and the preparation yield may be improved.

The small-size conjugated diene-based polymer and the large-size conjugated diene-based polymer may have a latex type dispersed in water in a colloid state, and may be added to a reactor prior to initiating polymerization.

The total amount of the aromatic vinyl-based monomer and the vinyl cyan-based monomer may be 30 to 50 wt %, or 35 to 45 wt % with respect to the total weight of the small-size conjugated diene-based polymer, the large-size conjugated diene-based polymer, the aromatic vinyl-based monomer and the vinyl cyan-based monomer, and among them, addition of 35 to wt % is preferable. If the above-described range is satisfied, the heat resistance, rigidity, impact resistance, processability and surface gloss of the graft copolymer may be even further improved.

The weight ratio of the aromatic vinyl-based monomer and the vinyl cyan-based monomer may be 80:20 to 65:35, or 75:25 to 70:30, and among them, 75:25 to 70:30 is preferable. If the above-described range is satisfied, a polymerization conversion ratio is increased, and polymerization stability and latex stability may be even further improved.

The polymerization may be performed in the presence of one or more selected from the group consisting of an emulsifier, an initiator, a redox-based catalyst, a molecular weight adjusting agent and ion exchange water.

The kind of the emulsifier is the same as described in step 1.

The emulsifier may be added in 0.1 to 3 parts by weight, or 0.5 to 1.5 parts by weight with respect to total 100 parts by weight of the small-size conjugated diene-based polymer, the large-size conjugated diene-based polymer, the aromatic vinyl-based monomer and the vinyl cyan-based monomer, and among them, addition in 0.5 to 1.5 parts by weight is preferable. If the above-described range is satisfied, the polymerization may be easily performed and the remaining amount in the graft copolymer may be minimized.

The initiator may be a peroxide-based initiator and the kind of the peroxide-based initiator is the same as explained in step 1.

The initiator may be added in 0.1 to 1 parts by weight, or 0.2 to 0.5 parts by weight with respect to total 100 parts by weight of the small-size conjugated diene-based polymer, the large-size conjugated diene-based polymer, the aromatic vinyl-based monomer and the vinyl cyan-based monomer, and among them, addition in 0.2 to 0.5 parts by weight is preferable. If the above-described range is satisfied, the polymerization may be easily performed and the remaining amount in the graft copolymer may be minimized.

The kind of the redox-based catalyst is the same as explained in step 1.

The redox-based catalyst may be added in 0.1 to 1 parts by weight, or 0.2 to 0.5 parts by weight with respect to total 100 parts by weight of the small-size conjugated diene-based polymer, the large-size conjugated diene-based polymer, the aromatic vinyl-based monomer and the vinyl cyan-based monomer, and among them, addition in 0.2 to 0.5 parts by weight is preferable. If the above-described range is satisfied, a high polymerization conversion ratio may be secured and the remaining amount in the graft copolymer may be minimized.

The molecular weight adjusting agent may be one or more selected from the group consisting of t-dodecyl mercaptan, n-dodecyl mercaptan, n-octyl mercaptan and an α-methyl styrene dimer, and among them, one or more selected from the group consisting of t-dodecyl mercaptan or an α-methyl styrene dimer are preferable.

The molecular weight adjusting agent may be 0.01 to 0.5 parts by weight or 0.1 to 0.4 parts by weight with respect to total 100 parts by weight of the small-size conjugated diene-based polymer, the large-size conjugated diene-based polymer, the aromatic vinyl-based monomer and the vinyl cyan-based monomer, and among them, addition of 0.1 to 0.4 parts by weight is preferable. If the above-described range is satisfied, the weight average molecular weight of a shell is suitably maintained, and the mechanical properties and surface characteristics of the graft copolymer may be even more improved.

One or more selected from the group consisting of the aromatic vinyl-based monomer, the vinyl cyan-based monomer and the emulsifier may be added in installments before and after the initiation of the polymerization.

If the addition in installments is performed after the initiation of the polymerization, the addition in installments may be performed after 0 to 1 hour, or 0 to 30 minutes from the initiation of the polymerization, and among them, the addition in installments after 0 to 30 minutes is preferable. If the addition in installments is performed under the above-described conditions, impact strength and polymerization stability may be even more improved.

If the aromatic vinyl-based monomer, the vinyl cyan-based monomer and the emulsifier are added after the initiation of the polymerization, the addition is preferably performed in a constant rate by continuous addition to improve polymerization and latex stability.

The aromatic vinyl-based monomer, and the vinyl cyan-based monomer may be added in installments in a weight ratio of 5:95 to 20:80, or 10:90 to 20:80 before and after the initiation of the polymerization, and the addition in installments is preferably performed in a weight ratio of 10:90 to 20:80. If the above-described conditions are satisfied, polymerization and latex stability may be even more improved.

The emulsifier may be added in installments before and after the initiation of the polymerization in a weight ratio of 50:50 to 10:90, or 50:50 to 20:80, and addition in installments in a weight ratio of 50:50 to 20:80 is preferable. If the above-described conditions are satisfied, a suitable reaction rate may be secured at the beginning of the polymerization, and polymerization stability may be further more improved throughout the polymerization as well as at the beginning of the polymerization.

The method for preparing a graft copolymer according to another embodiment of the present invention may further include a step of further adding an initiator and a redox-based catalyst and polymerizing after finishing the addition in installments, in order to improve a polymerization conversion ratio.

The initiator may be a peroxide-based initiator, and the kinds and amounts of the peroxide-based initiator and the redox-based catalyst are the same as explained in step 1.

In step 3, the addition amounts of the emulsifier, initiator, redox-based catalyst and molecular weight adjusting agent may be based on the total 100 parts by weight of the conjugated diene-based polymer, the aromatic vinyl-based monomer and the vinyl cyan-based monomer, which are added in step 3.

The graft ratio of the graft copolymer prepared in step 3 may be 45 to 60%, or 45 to 55%, and among them, 45 to 55% is preferable. If the above-described range is satisfied, the conjugated diene-based polymer may be dispersed in the graft copolymer more uniformly, and impact strength may be even more improved.

The weight average molecular weight of the shell of the graft copolymer may be 50,000 to 150,000 g/mol or 80,000 to 120,000 g/mol, and among them, 80,000 to 120,000 g/mol is preferable. If the above-described range is satisfied, balance between processability and mechanical properties may be achieved even better.

The molecular weight distribution of the shell of the graft copolymer may be 1.8 to 2.7, or 2.2 to 2.5, and among them, 2.2 to 2.5 is preferable. If the above-described range is satisfied, excellent flowability and impact resistance may be secured at the same time.

2. Thermoplastic Resin Composition

The thermoplastic resin composition according to another embodiment of the present invention includes 1) the graft copolymer prepared according to an embodiment of the present invention; and 2) a copolymer including a unit derived from an aromatic vinyl-based monomer and a unit derived from a vinyl cyan-based monomer.

Hereinafter, the thermoplastic resin composition according to another embodiment of the present invention and each constituent element will be explained in detail.

1) Graft Copolymer

The graft copolymer is prepared by the method for preparing a graft copolymer according to an embodiment of the present invention.

The graft copolymer may impart the thermoplastic resin composition with excellent plating properties, coloring properties, mechanical properties, surface characteristics and processability.

2) Copolymer

The copolymer includes the unit derived from an aromatic vinyl-based monomer and the unit derived from a vinyl cyan-based monomer.

The copolymer may impart the thermoplastic resin composition with excellent mechanical properties, heat resistance and processability.

The unit derived from an aromatic vinyl-based monomer is a unit derived from an aromatic vinyl-based monomer, and the unit derived from a vinyl cyan-based monomer is a unit derived from a vinyl cyan-based monomer.

The copolymer may include the unit derived from an aromatic vinyl-based monomer and the unit derived from a vinyl cyan-based monomer in 80:20 to 70:30, or 75:25 to 70:30, and among them, 75:25 to 70:30 is preferable. If the above-described range is satisfied, balance of mechanical properties, processability and heat resistance may be achieved well.

The weight ratio of the graft copolymer and the copolymer may be 20:80 to 35:65, or 25:75 to 30:70, and among them, 25:75 to 30:70 is preferable. If the above-described range is satisfied, the plating properties, coloring properties, mechanical properties, surface characteristics and processability of a molded article manufactured from the thermoplastic resin composition may be even more improved.

Meanwhile, the molded article manufactured using the thermoplastic resin composition according to another embodiment of the present invention has a plating adhesion strength of 7 N/m or more, and 9 N/m or more is preferable. If the above-described conditions are satisfied, plating properties are markedly excellent and the molded article may be used for cars.

The plating adhesion strength may be measured by adsorbing palladium onto a specimen manufactured by extruding or adding the thermoplastic resin composition, plating thereof with nickel sulfate to manufacturing a plating specimen, scratching the front portion of three plating specimens to a width of 10 mm, and obtaining a value by exfoliating about 80 mm in a vertical direction using a pull gage.

The thermoplastic resin molded article has an izod impact strength of 25 kg·cm/cm or more, and 24 to 30 kg·cm/cm is preferable. If the above-described conditions are satisfied, a molded article having excellent mechanical properties may be provided.

The izod impact strength may be measured based on ASTM D256.

MODE FOR CARRYING OUT THE INVENTION

Hereinafter, preferred embodiments will be explained in detail so that a person skilled in the art could easily perform the present invention. However, the present invention may be accomplished in various other types and is not limited to the embodiments explained herein.

Example 1

<Preparation of Small-Size Conjugated Diene-Based Polymer>

To a nitrogen-substituted polymerization reactor, 120 parts by weight of ion-exchange water, 80 parts by weight of 1,3-butadiene, 3.5 parts by weight of a potassium oleate dimer as an emulsifier, 0.2 parts by weight of t-dodecyl mercaptan as a molecular weight adjusting agent, 0.3 parts by weight of $Na_2CO_3$ as an electrolyte, and 0.03 parts by weight of t-butyl hydroxide as an initiator were added and stirred to sufficiently mix. Then, the internal temperature of the reactor was elevated to 45° C., and 0.045 parts by weight of dextrose as a redox-based catalyst, 0.26 parts by weight of sodium pyrophosphate and 0.0005 parts by weight of ferrous sulfate were added in batch, followed by polymerizing for 4 hours. Then, 20 parts by weight of 1,3-butadiene, 0.5 parts by weight of a potassium rosinate as an emulsifier, 0.2 parts by weight of potassium persulfate as an initiator, and 3 parts by weight of ion exchange water were continuously added in a constant rate for 6 hours and polymerized while elevating the temperature to 80° C. After that, 0.03 parts by weight of t-butyl hydroperoxide, 0.045 parts by weight of dextrose, 0.26 parts by weight of sodium pyrophosphate and 0.0005 parts by weight of ferrous sulfate were added in batch to the polymerization reactor, and polymerization was performed for 5 hours while keeping the temperature of the polymerization reactor to 80° C. The polymerization was finished and a small-size butadiene rubbery polymer latex A was obtained. The small-size butadiene rubbery polymer latex A showed the gel content of 93%, a polymerization conversion ratio of 98%, and an average particle diameter of 0.12 μm.

<Preparation of Large-Size Conjugated Diene-Based Polymer>

While stirring 100 parts by weight of the small-size butadiene rubbery polymer latex A, an aqueous acetic acid solution including 1.5 parts by weight of acetic acid (5 wt %) was added in a constant rate for 30 minutes. Then, 0.2 parts by weight of a potassium rosinate and 1.5 parts by weight of potassium hydroxide were added to prepare a large-size butadiene rubbery polymer latex B. The large-size butadiene rubbery polymer latex B had an average particle diameter of 0.4 μm.

<Preparation of Graft Copolymer Powder>

To a nitrogen-substituted reactor, 6 parts by weight (based on the solid content) of the small-size butadiene rubbery polymer latex A, 54 parts by weight (based on the solid content) of the large-size butadiene rubbery polymer latex B, 1.25 parts by weight of acrylonitrile, 3.75 parts by weight of styrene, 100 parts by weight of ion exchange water, 0.5 parts by weight of a potassium oleate dimer as an emulsifier, 0.1 parts by weight of t-dodecyl mercaptan as a molecular weight adjusting agent, and 0.1 parts by weight of t-butyl hydroperoxide as an initiator were added, followed by stirring for sufficient mixing. Then, the internal temperature of the polymerization reactor was elevated to 45° C., and 0.045 parts by weight of dextrose as a redox-based catalyst, 0.26 parts by weight of sodium pyrophosphate and 0.0005 parts by weight of ferrous sulfate were added in batch, followed by polymerizing for 1 hour. Then, the temperature of the polymerization reactor was elevated to 70° C., and a mixture including 20 parts by weight of ion exchange water, 8.75 parts by weight of acrylonitrile, 26.25 parts by weight of styrene, 0.5 parts by weight of a potassium oleate dimer, 0.1 parts by weight of t-dodecyl mercaptan as a molecular weight adjusting agent, 0.1 parts by weight of an α-methyl styrene dimer, and 0.15 parts by weight of cumene hydroperoxide as an initiator, was continuously injected in a constant rate for 2 hours. Then, the temperature of the polymerization reactor was elevated to 80° C., and 0.045 parts by weight of dextrose, 0.26 parts by weight of sodium pyrophosphate, 0.0005 parts by weight of ferrous sulfate, and 0.1 parts by weight of cumene hydroperoxide were added in batch, followed by polymerizing for 1 hour. The reaction was finished and a graft copolymer latex was prepared.

The graft copolymer latex was coagulated, aged, washed, dehydrated and dried to prepare a graft copolymer powder A.

<Preparation of Thermoplastic Resin Composition>

25 parts by weight of the graft copolymer powder A and 75 parts by weight of 92HR (styrene/acrylonitrile copolymer) of LG Chem, were mixed to prepare a thermoplastic resin composition A.

Example 2

A graft copolymer powder B was prepared by the same method as in Example 1 except for adding 10 parts by weight (based on the solid content) of the small-size butadiene rubbery polymer latex A, and 50 parts by weight (based on the solid content) of the large-size rubbery butadiene polymer latex A for preparing a graft copolymer powder.

In addition, a thermoplastic resin composition B was prepared by the same method as in Example 1 except for using the graft copolymer powder B instead of the graft copolymer powder A.

Example 3

A graft copolymer powder C was prepared by the same method as in Example 1 except for adding 15 parts by weight (based on the solid content) of the small-size butadiene rubbery polymer latex A, and 45 parts by weight (based on the solid content) of the large-size butadiene rubbery polymer latex A for preparing a graft copolymer powder.

In addition, a thermoplastic resin composition C was prepared by the same method as in Example 1 except for using the graft copolymer powder C instead of the graft copolymer powder A.

Example 4

A graft copolymer powder D was prepared by the same method as in Example 1 except for adding 20 parts by weight (based on the solid content) of the small-size butadiene rubbery polymer latex A, and 40 parts by weight (based on the solid content) of the large-size butadiene rubbery polymer latex A for preparing a graft copolymer.

In addition, a thermoplastic resin composition D was prepared by the same method as in Example 1 except for using the graft copolymer powder D instead of the graft copolymer powder A.

Comparative Example 1

A graft copolymer powder E was prepared by the same method as in Example 1 except for not adding the small-size butadiene rubbery polymer latex A, and adding 60 parts by weight (based on the solid content) of the large-size butadiene rubbery polymer latex A for preparing a graft copolymer.

In addition, a thermoplastic resin composition E was prepared by the same method as in Example 1 except for using the graft copolymer powder E instead of the graft copolymer powder A.

Comparative Example 2

A graft copolymer powder F was prepared by the same method as in Example 1 except for adding 25 parts by weight (based on the solid content) of the small-size butadiene rubbery polymer latex A, and adding 35 parts by weight (based on the solid content) of the large-size butadiene rubbery polymer latex A for preparing a graft copolymer.

In addition, a thermoplastic resin composition F was prepared by the same method as in Example 1 except for using the graft copolymer powder F instead of the graft copolymer powder A.

Comparative Example 3

<Preparation of Large-Size Conjugated Diene-Based Polymer>

To a nitrogen-substituted polymerization reactor, 100 parts by weight of ion-exchange water, 30 parts by weight of 1,3-butadiene, 0.5 parts by weight of a potassium rosinate, 0.3 parts by weight of t-dodecyl mercaptan, 1.0 part by weight of $K_2CO_3$, and 0.1 parts by weight of potassium persulfate were added and stirred for 1 hour. Then, the reaction was performed for 5 hours while elevating the reaction temperature to 65° C., and then, 70 parts by weight of 1,3-butadiene was continuously added for 7 hours and the reaction was continued. In this case, 0.5 parts by weight of a potassium rosinate was additionally added for reaction stability, 0.1 parts by weight of potassium persulfate was additionally added at a point when a polymerization conversion ratio was 90%, and the reaction was finished to obtain a large-size butadiene rubbery polymer latex G. The large-size butadiene rubbery polymer latex G thus obtained showed a polymerization conversion ratio of 95%, an average particle diameter of 0.3 μm, and the gel content of 82%.

<Preparation of Graft Copolymer Powder>

To a nitrogen-substituted reactor, 100 parts by weight of ion exchange water, 10 parts by weight (based on the solid content) of the small-size butadiene rubbery polymer latex A, 50 parts by weight (based on the solid content) of the large-size butadiene rubbery polymer latex G, 1.25 parts by weight of acrylonitrile, 3.75 parts by weight of styrene, 0.5 parts by weight of a potassium oleate dimer as an emulsifier, 0.1 parts by weight of t-dodecyl mercaptan as a molecular weight adjusting agent, and 0.1 parts by weight of t-butyl hydroperoxide as an initiator were added, followed by stirring for sufficient mixing. Then, the internal temperature of the polymerization reactor was elevated to 45° C., and 0.045 parts by weight of dextrose as a redox-based catalyst, 0.26 parts by weight of sodium pyrophosphate and 0.0005 parts by weight of ferrous sulfate were added in batch, followed by polymerizing for 1 hour. Then, the temperature of the polymerization reactor was elevated to 70° C., and a mixture including 20 parts by weight of ion exchange water, 8.75 parts by weight of acrylonitrile, 26.25 parts by weight of styrene, 0.5 parts by weight of a potassium oleate dimer, 0.1 parts by weight of t-dodecyl mercaptan as a molecular weight adjusting agent, 0.1 parts by weight of an α-methyl styrene dimer, and 0.15 parts by weight of cumene hydroperoxide as an initiator, was continuously added in a constant rate for 2 hours. Then, the temperature of the polymerization reactor was elevated to 80° C., and 0.045 parts by weight of dextrose, 0.26 parts by weight of sodium pyrophosphate, 0.0005 parts by weight of ferrous sulfate, and 0.1 parts by weight of cumene hydroperoxide were added in batch, followed by polymerizing for 1 hour. The reaction was finished and a graft copolymer latex was prepared.

The graft copolymer latex was coagulated, aged, washed, dehydrated and dried to prepare a graft copolymer powder G.

<Preparation of Thermoplastic Resin Composition>

25 parts by weight of the graft copolymer powder G and 75 parts by weight of 92HR (styrene/acrylonitrile copolymer) of LG Chem, were mixed to prepare a thermoplastic resin composition G.

Hereinafter, the kinds and addition amounts of the small-size conjugated diene-based polymer latexes and large-size conjugated diene-based polymer latexes of the Examples and the Comparative Examples are summarized and listed in [Table 1] below.

Experimental Example 1

The physical properties of the graft copolymer powders of the Examples and the Comparative Examples were measured by the methods described below and the results are listed in [Table 1] below.

(1) Polymerization conversion ratio (%): 5 g of a polymerized latex was dried in a hot air drier at 150° C. for 15 minutes, and only the solid content was taken, the total solid content of an initial latex was obtained, and a polymerization conversion ratio of a monomer was calculated using the same:

Polymerization conversion ratio (%)=[(total solid content (TSC,%)×(total amount of materials added for polymerization=monomer+water+additives, etc.)]−impurities other than monomer (excluding water)]

(2) Graft ratio (%): 1 g of a graft copolymer powder was dissolved in 50 g of acetone while stirring for 24 hours. This solution was added to a centrifuge which was set to 20,000 rpm and −20° C., a supernatant was separated, and a precipitate was dried using a hot air drier for 12 hours. The weight of the dried material thus obtained was measured and the graft ratio was measured according to the following equation:

Graft ratio (%)=[(amount of grafted SAN copolymer)/(sum of amounts of small-size butadiene rubbery polymer and large-size butadiene rubbery polymer)]×100 sum of amounts of small-size butadiene rubbery polymer and large-size butadiene rubbery polymer: the solid content of small-size butadiene rubbery polymer and large-size butadiene rubbery polymer added theoretically amount of grafted SAN copolymer=(amount of dried material obtained)−(sum of amounts of small-size butadiene rubbery polymer and large-size butadiene rubbery polymer)

(3) Solid coagulated fraction (%): the graft copolymer latex was filtered using a 100 mesh wire filter, a polymer not passed through the wire was dried in a hot air drier of 100° C. for 1 hour, and a ratio was shown with respect to a theoretical total amount of acrylonitrile, styrene, butadiene rubbery polymer and additives (emulsifier, etc.) added.

(4) Weight average molecular weight of shell (g/mol) and molecular weight distribution: the supernatant (sol) separated by the measurement method (sol-gel separation) of the graft ratio was dried in a hot air oven of 50° C. Then, the dried material was dissolved in THF to prepare a solution (concentration: 0.1 wt %), and this solution was filtered using a filter of 0.1 μm, and finally the weight average molecular weight and molecular weight distribution were obtained using a GPC equipment (manufacturer: waters Co.).

Experimental Example 2

100 parts by weight of the thermoplastic resin compositions of the Examples and the Comparative Examples and parts by weight of a lubricant (product name: EBA, manufacturer: LG Household & Health Care Ltd.) were mixed uniformly, and added to a twin-screw extruder set to 200° C. and extruded to prepare a pellet. The physical properties of the pellet were measured by the methods below, and the results are listed in [Table 1].

(1) Melt Flow index (g/10 min): measured at 220° C. under 10 kg based on ASTM D1238.

Experimental Example 3

A specimen was manufactured using the pellet prepared in Experimental Example 2, and the physical properties thereof were measured by the methods below. The results are listed in [Table 1] below.

(1) Izod impact strength (kgf·cm/cm, ¼ In): measured based on ASTM D256.

(2) Falling sphere impact strength (J): measured based on ASTM D3763.

(3) Gloss (%): measured using a gloss specimen which was obtained by injecting the thermoplastic resin composition at 200° C. by means of a gloss meter at 45° based on ASTM D528. The surface gloss is improved with the increase of the value thus obtained.

(4) Residence gloss reduction ratio (%): the gloss specimen obtained by injecting the thermoplastic resin composition at 200° C. was resided at 250° C. for 15 minutes and the gloss (45°) of a residence specimen was measured. In addition, the residence gloss reduction ratio was calculated by the following equation:

Residence gloss reduction ratio (%)=[(gloss of gloss specimen)−(gloss of residence specimen)]/(gloss of gloss specimen)×100

Experimental Example 4

The pellet manufactured in Experimental Example 2 was injected to manufacture a rectangular specimen (10 mm×10 mm×3 mm). This specimen was washed, etched (anhydrous chromic acid-sulfuric acid) at 65° C. for 15 minutes, and palladium was adsorbed using a palladium tin catalyst. The palladium adsorbed specimen was plated with nickel sulfate to manufacture a plating specimen. The physical properties of the plating specimen were measured by the methods below, and the results are listed in [Table 1] below.

(1) Plating appearance: the overall plating state of a plating specimen was secured with the naked eye, and if an un-plating region was present or plating swelling phenomenon was generated with respect to the entire plating surface, it was assessed as a plating bad state, and other states were assessed as a plating good state.

(2) Plating adhesion strength (N/m): scratches were made on the front portions of three plating specimens to a width of 10 mm, and a value obtained by exfoliating about 80 mm in a vertical direction using a pull gage was measured.

Experimental Example 5

100 parts by weight of the thermoplastic resin compositions of the Examples and the Comparative Examples, 2 parts by weight of a lubricant (product name: EBA, manufacturer: LG Household & Health Care Ltd.), and 0.03 parts by weight of a coloring agent (product name: BL03-blue color, manufacturer: mingzu) were mixed uniformly, and added to a twin-screw extruder set to 200° C. and extruded to prepare a pellet and then injected at 200° C. to manufacture a specimen. The physical properties of the specimen were measured by the methods below, and the results are listed in [Table 1].

(1) Coloring properties (%): the coloring properties were evaluated using a Hunter Lab (product name, manufacturer: hunterLab) measurement apparatus and a software of Easy match QA version 3.7. In this case, the measurement method of the coloring properties was AATCC evaluation procedure 6 "Instrumental color measurement".

Coloring properties (%)=(K/S sample)/(K/S standard)×100

K/S value=[1−0.01R]$^2$/2[0.01R]
R: spectral reflectance

TABLE 1

| Division | | Example | | | | Comparative Example | | |
|---|---|---|---|---|---|---|---|---|
| | | 1 | 2 | 3 | 4 | 1 | 2 | 3 |
| Small-size conjugated diene-based polymer latex (parts by weight) | A | 6 | 10 | 15 | 20 | — | 25 | 10 |
| Large-size conjugated diene-based polymer latex (parts by weight) | B | 54 | 50 | 45 | 40 | 60 | 35 | — |
| | G | — | — | — | — | — | — | 50 |
| Polymerization conversion ratio | | 98 | 99 | 98 | 98 | 96 | 98 | 96 |
| Graft ratio | | 47 | 46 | 52 | 50 | 27 | 20 | 32 |

TABLE 1-continued

| Division | Example | | | | Comparative Example | | |
|---|---|---|---|---|---|---|---|
| | 1 | 2 | 3 | 4 | 1 | 2 | 3 |
| Solid coagulant fraction | 0.03 | 0.02 | 0.03 | 0.03 | 0.05 | 0.07 | 0.10 |
| Weight average molecular weight of shell | 110,000 | 120,000 | 100,000 | 115,000 | 75,000 | 80,000 | 65,000 |
| Molecular weight distribution | 2.1 | 2.2 | 2.1 | 2.0 | 2.7 | 2.6 | 2.6 |
| Melt Flow index | 24 | 25 | 25 | 24 | 24 | 18 | 18 |
| Izod impact strength | 31 | 29 | 27 | 26 | 23 | 15 | 16 |
| Falling sphere impact strength | 50 | 53 | 52 | 50 | 30 | 20 | 25 |
| Gloss | 102 | 103 | 105 | 107 | 102 | 95 | 90 |
| Residence gloss reduction ratio | 1 | 3 | 5 | 4 | 4 | 20 | 25 |
| Plating appearance | Good | Good | Good | Good | Bad | Bad | Bad |
| Plating adhesion strength | 9.3 | 9.9 | 10.3 | 11.0 | 5.2 | 3.1 | 5.3 |
| Coloring properties | 108 | 115 | 105 | 110 | 100 | 96 | 92 |

Referring to Table 1, it was found that the graft copolymers of Example 1 to Example 4 showed higher graft ratio and weight average molecular weight of a shell when compared with the graft copolymers of Comparative Example 1 to Comparative Example 3. In addition, it was found that the solid coagulant fraction was low, latex stability was excellent, molecular weight distribution was narrow, and more uniform graft copolymers were prepared. It was found that the thermoplastic resin compositions of Example 1 to Example 4 showed markedly improved izod impact strength and falling sphere impact strength and thus, showed excellent mechanical properties when compared with the thermoplastic resin compositions of Comparative Example 1 to Comparative Example 3. In addition, it was found that the gloss, residence gloss reduction ratio, etc. were equivalent or better, and surface properties were excellent. In addition, it was found that since the plating appearance and plating adhesion strength were markedly excellent, plating properties were excellent. Also, since the coloring properties are markedly excellent, it may be expected that the design of elegant appearance might be possible.

Meanwhile, the graft copolymer of Comparative Example 1, which was prepared by only the large-size butadiene rubbery polymer, was found to show a low graft ratio and weight average molecular weight of a shell. In addition, it was found that the molecular weight distribution was high and a graft copolymer having uniform physical properties was not prepared. In addition, it was found that since the amount of the solid coagulant fraction was high and latex stability was degraded. In addition, the thermoplastic resin composition of Comparative Example 1 showed decreased izod impact strength, falling sphere impact strength, plating properties and coloring properties. The graft copolymer of Comparative Example 2, which was prepared by adding an excessive amount of the small-size butadiene rubbery polymer, was found to show a low graft ratio and weight average molecular weight of a shell. In addition, it was found that since the molecular weight distribution was high, a graft copolymer having uniform physical properties was not prepared. In addition, since the amount of the solid coagulant fraction was high, the latex stability was decreased. In addition, the thermoplastic resin composition of Comparative Example 2 was found to show decreased izod impact strength, falling sphere impact strength, plating properties and coloring properties. Comparative Example 3, which used the large-size butadiene rubbery polymer prepared by only polymerization, was found to show a low graft ratio and weight average molecular weight of a shell, though the small-size butadiene rubbery polymer and the large-size butadiene rubbery polymer were added in the same weight ratio as in Example 2. In addition, since the molecular weight distribution was high, a graft copolymer having uniform properties was not prepared. In addition, since the amount of the solid coagulant fraction was high, the latex stability was found to decrease. Also, the thermoplastic resin composition of Comparative Example 3 was found to show markedly decreased izod impact strength, falling sphere impact strength, gloss, plating properties and coloring properties.

The invention claimed is:

1. A method for preparing a graft copolymer, the method comprising:
    polymerizing a conjugated diene-based monomer to prepare a small-size conjugated diene-based polymer;
    enlarging the small-size conjugated diene-based polymer to prepare a large-size conjugated diene-based polymer; and
    polymerizing the small-size conjugated diene-based polymer, the large-size conjugated diene-based polymer, an aromatic vinyl-based monomer and a vinyl cyan-based monomer to prepare a graft copolymer with a graft ratio of 45-60%,
    wherein a weight ratio of the small-size conjugated diene-based polymer and the large-size conjugated diene-based polymer is 10:90 to 40:60 in preparing the graft copolymer, and
    wherein the gel content of the small-size conjugated diene-based polymer is 80 to 95%.

2. The method for preparing a graft copolymer according to claim 1, wherein a weight ratio of the small-size conjugated diene-based polymer and the large-size conjugated diene-based polymer is 25:75 to 35:65 in preparing the graft copolymer.

3. The method for preparing a graft copolymer according to claim 1, wherein an average particle diameter of the small-size conjugated diene-based polymer is 0.05 to 0.15 µm.

4. The method for preparing a graft copolymer according to claim 1, wherein preparing the large-size conjugated diene-based polymer corresponds to enlargement by adding a coagulant to the small-size conjugated diene-based polymer.

5. The method for preparing a graft copolymer according to claim 4, wherein the coagulant is one or more selected from the group consisting of phosphoric acid and acetic acid.

6. The method for preparing a graft copolymer according to claim 1, wherein an average particle diameter of the large-size conjugated diene-based polymer is 0.3 to 0.5 μm.

7. The method for preparing a graft copolymer according to claim 1, wherein the polymerization is performed by emulsion polymerization.

8. A thermoplastic resin molded article manufactured using a thermoplastic resin composition comprising:
   the graft copolymer prepared according to claim 1; and
   a copolymer comprising a unit derived from an aromatic vinyl-based monomer and a unit derived from a vinyl cyan-based monomer,
   wherein a plating adhesion strength is 7 N/m or more.

9. The thermoplastic resin molded article according to claim 8, wherein the thermoplastic resin molded article has an izod impact strength of 25 kg·cm/cm or more.

10. The method of claim 1, wherein the shell of the graft copolymer has a molecular weight distribution of 1.8 to 2.7.

* * * * *